US011272024B2

(12) United States Patent
Mitsov et al.

(10) Patent No.: US 11,272,024 B2
(45) Date of Patent: Mar. 8, 2022

(54) PERSISTING AN HTTP CONNECTION BETWEEN APPLICATION COMPONENTS

(71) Applicant: VMware, Inc., Palo Alto, CA (US)

(72) Inventors: Georgi Mitsov, Kyustendeil (BG); Miroslav Mitevski, Sofia (BG); Tina Nakova, Sofia (BG); Zhan Ivanov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/745,272

(22) Filed: Jan. 16, 2020

(65) Prior Publication Data
US 2021/0227038 A1 Jul. 22, 2021

(51) Int. Cl.
| | |
|---|---|
| G06F 15/16 | (2006.01) |
| H04L 67/561 | (2022.01) |
| H04L 9/32 | (2006.01) |
| H04L 43/08 | (2022.01) |
| H04L 67/02 | (2022.01) |
| H04L 67/56 | (2022.01) |
| H04L 29/06 | (2006.01) |

(52) U.S. Cl.
CPC ........ H04L 67/2804 (2013.01); H04L 9/3213 (2013.01); H04L 43/08 (2013.01); H04L 67/02 (2013.01); *H04L 63/08* (2013.01); *H04L 63/0807* (2013.01); *H04L 67/28* (2013.01)

(58) Field of Classification Search
CPC ....... H04L 67/02; H04L 67/14; H04L 67/141; H04L 67/142; H04L 67/143; H04L 67/145; H04L 67/146; H04L 67/147; H04L 67/148
See application file for complete search history.

(56) References Cited

U.S. PATENT DOCUMENTS

2012/0284713 A1* 11/2012 Ostermeyer ........ G06F 11/3409
  718/1
2018/0332629 A1* 11/2018 Huang ................ H04W 74/006
2020/0226284 A1* 7/2020 Yin ..................... G06F 21/6254

OTHER PUBLICATIONS

Mahendra Y, "Persistent HTTPS Connections: Reduce API call time by 50%", Oct. 10, 2018 (Year: 2018).*

* cited by examiner

*Primary Examiner* — Ryan J Jakovac
(74) *Attorney, Agent, or Firm* — Su IP Consulting

(57) ABSTRACT

Persistent connections are provided between components in a container environment. A hypertext transfer protocol (HTTP) client may include a monitoring service and a proxy service. To obtain information regarding containers in the container environment, the monitoring service communicates a request to the proxy service. The proxy service in turn maintains a persistent connection for a session with a container management service using an authentication token, and communicates the request to the container management service during the session. The container management service obtains the requested information from the container(s) and returns the information in a response to the proxy service, which in turn returns the response to the monitoring service. The session is destroyed/ended only under certain error conditions—otherwise, the session between the proxy service and the container management system is kept persistent.

21 Claims, 4 Drawing Sheets

PERSISTING AN HTTP CONNECTION BETWEEN APPLICATION COMPONENTS

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A virtual machine running on a host is one example of a virtualized computing instance or workload. A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc.

In a container environment wherein various container applications or components thereof may be distributed, different components (e.g., microservices) may communicate with each other using hypertext transfer protocol (HTTP). For example, a monitoring component may frequently poll/call the services via HTTP. This frequent communication creates severe overhead impacts since a new HTTP session is being established on each call and then destroyed after the call is completed.

DETAILED DESCRIPTION

Figure 1:
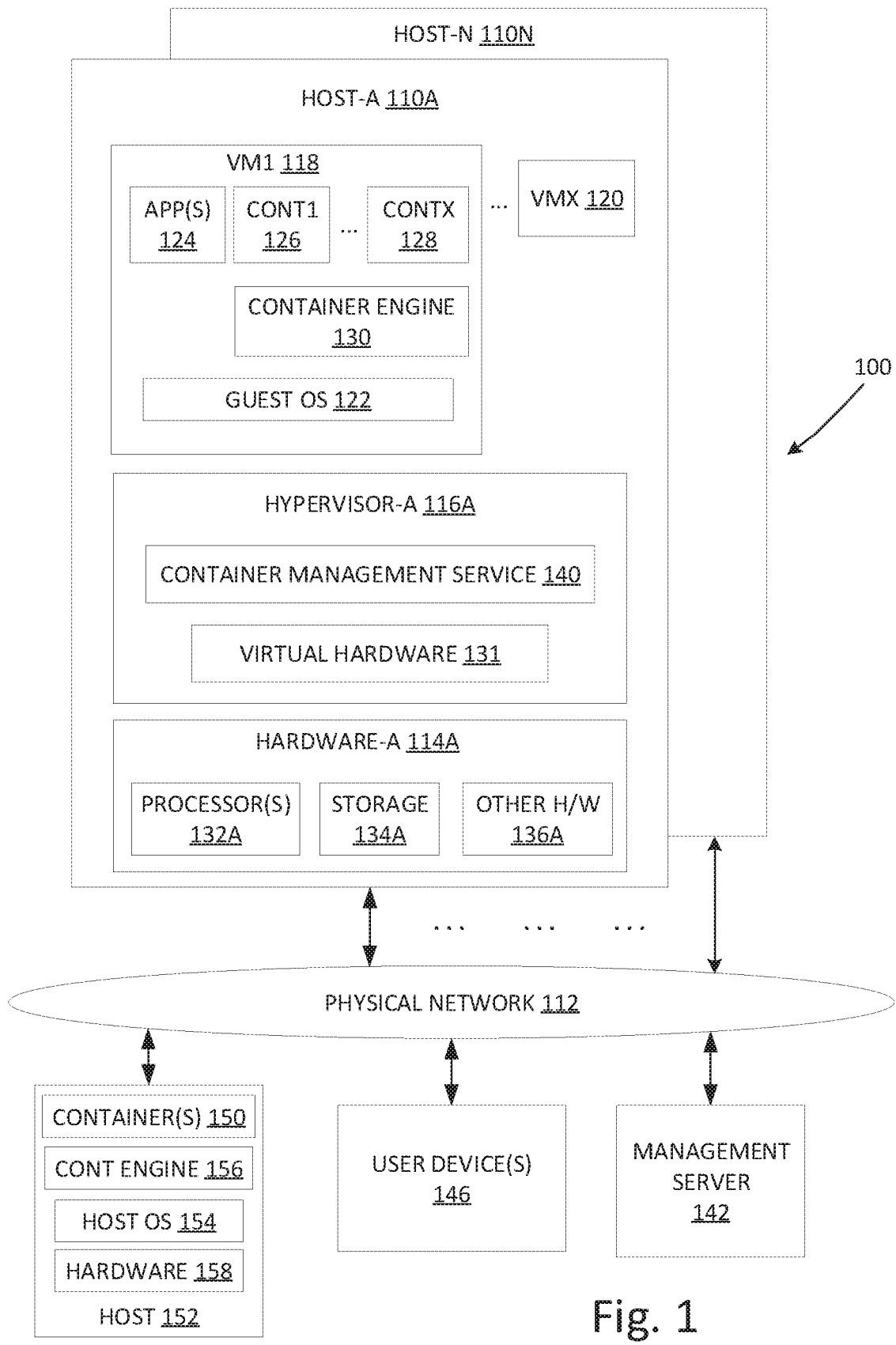
FIG. 1 is a schematic diagram illustrating an example virtualized computing environment having containers and that can implement a method for communication with a persistent connection between components.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks in a container environment, by providing persistent connections between components in the container environment. An HTTP client may include a monitoring service and a proxy service. To obtain information regarding applications/containers in the container environment, the monitoring service communicates a request to the proxy service. The proxy service in turn maintains a persistent connection for a session with a container management service using an authentication token, and communicates the request to the container management service during the session. The container management service obtains the requested information from the application(s) and returns the information in a response to the proxy service, which in turn returns the response to the monitoring service. The session is destroyed/ended only under certain circumstances, such as if the authentication token fails and other circumstances described below involving an error condition—otherwise, the session between the proxy service and the container management system is kept persistent.

Computing Environment

To further explain the operation and interaction of the monitoring service, the proxy service, and the container management service in the context of a persistent connection, various implementations will now be explained in more detail using FIG. 1, which is a schematic diagram illustrating an example virtualized computing environment 100 having containers and that can implement a method for communication with a persistent connection between components. For the purposes of explanation, such components will be described hereinafter as being services. Other possible examples of such components can be application program interfaces (APIs), subroutines, applications, background processes, daemons, scripts, software modules, engines, user interfaces, agents, or other type of computer-executable instructions stored on a computer-readable medium and executable by a processor. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware 114A and virtualization software (e.g., hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest operating system 122. VM1 118 may also include and support one or more containers (shown as Container1 126 . . . ContainerX 128). As used herein, the term container (also known as container instance) is used generally to describe an application that is encapsulated with all its dependencies (e.g., binaries, libraries, etc.). A container engine 130 may be used to support the operation of the containers 126-128. The container engine 130 and related container technology is available from, among others, Docker, Inc.

In the example of FIG. 1, running containers 126-128 that reside inside VM1 118 (known as a containers-on-virtual-machine approach) not only leverages the benefits of container technologies but also that of virtualization technologies. Containers 126-128 may be executed as isolated processes inside VM1 118 and may be supported by guest OS 122. Containers 126-128 are OS-less, meaning that they do not include any OS that could weigh 10s of gigabytes (GB). This makes containers 126-128 more lightweight, portable, efficient, and suitable for delivery into an isolated OS environment.

Hypervisor-A 116A may be a software layer or component that supports the execution of multiple virtualized computing instances. Hypervisor 116A may run on top of a host operating system (not shown) of the host-A 110A or may run directly on hardware 114A. Hypervisor 116A maintains a mapping between underlying hardware 114A and virtual resources (depicted as virtual hardware 131) allocated to VM1 118 and the other VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 131) are allocated to each virtual machine to support a guest operating system (OS) and application(s) in the virtual machine, such as the guest OS 122 and the applications 124 (e.g., a word processing application, accounting software, a browser, etc.) and the containers 126-128 in VM1 118. Corresponding to the hardware 114A, the virtual hardware 130 may include a virtual CPU, a virtual memory, a virtual disk, a virtual network interface controller (VNIC), etc.

A container management service 140 may run on top of or within the hypervisor-A 116A. In the example embodiment of FIG. 1, the container management service 140 is depicted as running within or as part of the hypervisor-A 116A. In other embodiments, the container management service 140 may run within or may be installed at other locations within the host-A 110A. In still other embodiments, the container management service 140 (or elements thereof, such as in a distributed implementation) may be run within or may be installed at a management server 142, alternatively or additionally to being present in the host-A 110A.

The container management service 140 may be configured in one embodiment to, among other things, configure and update the containers 126-128 and the container engine 130, monitor the operation of the containers 126-128 and the container engine 130, control/manage the operation of the containers 126-128 and the container engine 130, communicate requests to and receive responses from the containers 126-128 and the container engine 130, and to perform other tasks associated with cooperating with the container engine 130 to manage the operation of the containers 126-128. An example of the container management service 140 is the Admiral product from VMware, Inc. As will be described further below with respect to FIGS. 2-4, the container management service 140 of one embodiment may operate in conjunction with a monitoring service and a proxy service so as to provide information regarding the containers 126-128 to the monitoring service via a persistent connection.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionalilty of the management server 142 (including communicating with and operating the container management service 140 via the management server 142) may be accessed via one or more user devices 146 that are operated by a system administrator. For example and as will be described below with respect to FIG. 2, the user device 146 may include a web client (such as a browser-based application) that provides a user interface (that renders a monitoring dashboard) operable by the system administrator to view and monitor the operation of the containers 126-128, via the management server 142 and the container management service 140.

The management server 142 may be communicatively coupled to host-A 110A . . . host-N 110N (and hence communicatively coupled to the virtual machines, hypervisors, containers, hardware, etc.) via the physical network 112. The host-A 110A . . . host-N 110N may in turn be configured as a datacenter that is managed by the management server 142, and the datacenter may support a web site. In some embodiments, the functionality of the management server 142 may be implemented in any of host-A 110A . . . host-N 110N, instead of being provided as a separate stand-alone device such as depicted in FIG. 1.

While FIG. 1 shows containers 126-128 residing inside VM1 118 in a containers-on-virtual-machine approach, other container configurations may be provided in a container environment within or outside of the virtualized computing environment 100. For example, one or more containers 150 can run on a host 152 and share a host OS 154 with each other, with each of the containers 150 running as isolated processes. The containers 150 and their corresponding container engine 156 can use hardware 158 of the host 152 directly, without implementing a hypervisor, virtual machines, etc. in this example. The containers 150 and the container engine 156 of the host 152 may be managed by the container management service 140 in some embodiments.

Depending on various implementations, one or more of the physical network 112, the management server 142, the host 150, and the user device(s) 146 can comprise parts of the virtualized computing environment 100, or one or more of these elements can be external to the virtualized computing environment 100 and configured to be communicatively coupled to the virtualized computing environment 100.

Persistent Connection Between Components

Figure 2:
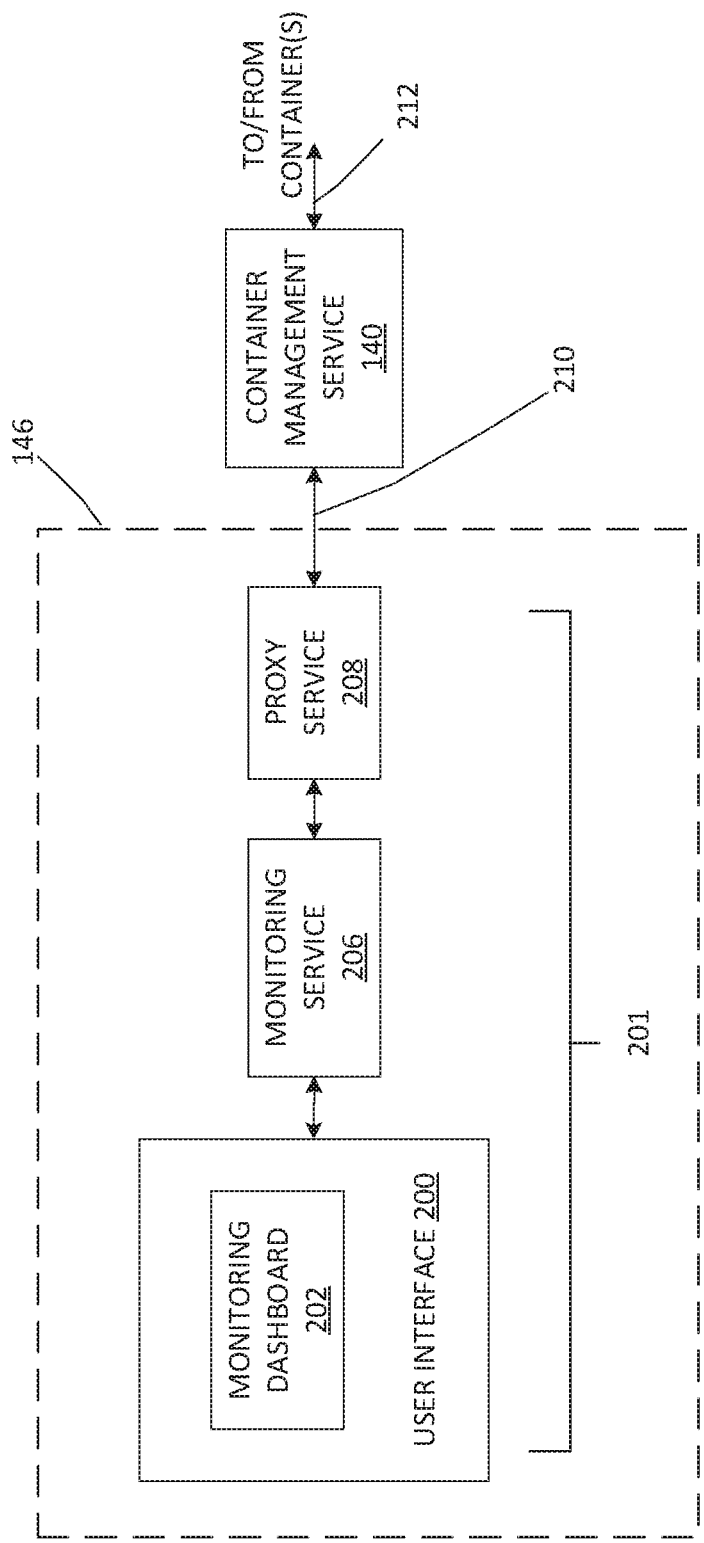
FIG. 2 is a block diagram illustrating the components involved in a persistent connection.

FIG. 2 is a block diagram illustrating the components involved in a persistent connection. Specifically, FIG. 2 shows the interaction between the container management service 140 and components of the user device 146 of the virtualized computing environment 100 of FIG. 1, for purposes of establishing and maintaining a persistent connection that enables the user device 146 to obtain information pertaining to the containers 126-128 (as well as the containers 150).

The user device 146 includes a user interface 200 that may be provided by, or may be part of, an HTTP client or other type of web-based client (such as a browser-based application), which is shown generally at 201. Input/output tools (such as a display screen, keyboard, mouse, etc.) of the user device 146 may provide the user interface 200, which in turn may render an on-screen monitoring dashboard 202 that presents information (such as performance metrics, diagnostic information, alerts, etc.) to a system administrator regarding various components (including the containers 126-128) of the virtualized computing environment 100. Furthermore, the monitoring dashboard 202 may provide the system administrator with tools to interact with the management server 142, the container management service 140, the hypervisors, VMs, containers, hosts, etc., for purposes of performing configurations, launching/disabling components, diagnostics, and so forth.

The HTTP client 201 further includes a monitoring service 206 that is in communication with the monitoring dashboard 202. Among other things, the monitoring service 206 may request and receive information (such as performance metrics, etc.) regarding the containers 126-128, so that the monitoring service 206 can provide such information to the user interface 200 for display in the monitoring dashboard 202. The monitoring service 206 may also be used by the system administrator to perform management operations, by interacting with the monitoring dashboard 202, the management server 142, the container management service 140, etc.

Within the HTTP client 201, a proxy in the form of a proxy service 208 may be provided to communicate with the monitoring service 206 and with components external to the user device 146, such as the container management service 140. As will be described in further detail below, the proxy service 208 of one embodiment establishes and maintains a persistent connection 210 (such as a persistent HTTP connection) with the container management service 140, such that the monitoring service 206 can request and receive information from the container management service 140 (regarding the containers 126-128) without having to repeatedly set up and tear down an HTTP session for each request.

As depicted in FIG. 2, the container management service 140 is in communication with the containers at 212. This communication 212 may include collecting performance metrics, diagnostic data, etc. from the containers and/or the container engines.

Figure 3:
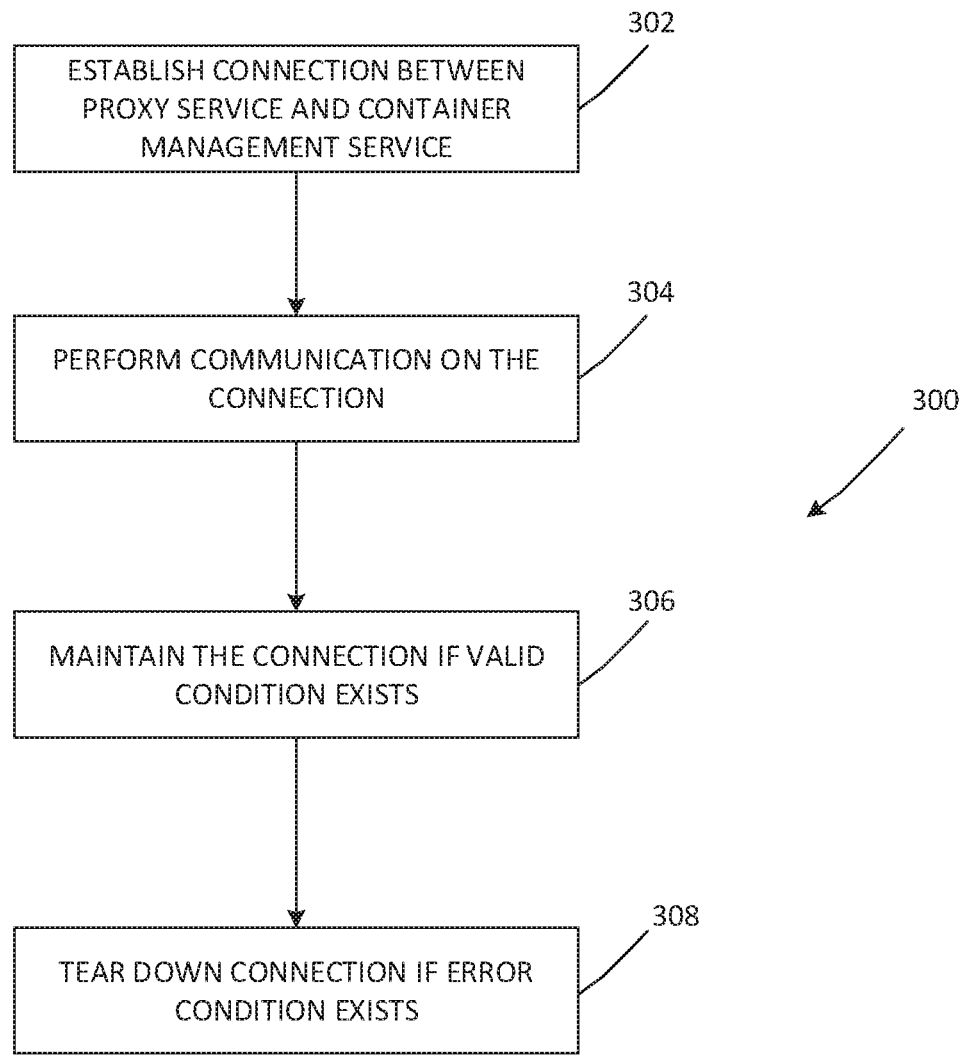
FIG. 3 is a flowchart of an example method for communication using a persistent connection between components.

Further details about the communication between the components of FIG. 2 are described next with respect to FIG. 3. Specifically, FIG. 3 is a flowchart of an example method 300 for communication using a persistent connection between the components of FIG. 2. The example method 300 may include one or more operations, functions, or actions illustrated by one or more blocks, such as blocks 302 to 308. The various blocks of the method 300 and/or of any other process(es) described herein may be combined into fewer blocks, divided into additional blocks, supplemented with further blocks, and/or eliminated based upon the desired implementation. In one embodiment, the operations of the method 300 may be performed in a pipelined sequential manner. In other embodiments, some operations may be performed out-of-order, in parallel, etc.

At a block 302 ("ESTABLISH CONNECTION BETWEEN PROXY SERVICE AND CONTAINER MANAGEMENT SERVICE"), the connection 210 is established between the proxy service 208 and the container management service 140. According to one embodiment, the process of establishing the connection to the container management service 140 may begin when the monitoring dashboard 202 is started/launched, which results in the launching of the monitoring service 206.

From the monitoring dashboard 202, the system administrator may specify a particular container that is to be monitored. The monitoring service 206 then loads the address of the container management service 140 (e.g., from memory), acquires an authentication token (also from memory or other source), and determines an identifier (ID) of a particular container to be monitored. Next, the proxy service 208 is launched/initialized, and the monitoring service 206 provides the address, the authentication token, and the ID to the proxy service 208.

The proxy service 208, in turn, uses the address, the authentication token, and the ID to establish a session on the connection 210 and to maintain the connection persistent, for purposes of obtaining information (e.g., performance metrics) about the particular container being monitored.

At a block 304 ("PERFORM COMMUNICATION ON THE CONNECTION"), the proxy service 208 receives requests from the monitoring service 206, and sends the requests to the container management service 140 via the connection 210. If the requests and the responses to the requests meet valid conditions (explained further with respect to FIG. 4 below), then the connection is maintained persistent by the proxy service 208 at a block 306 ("MAINTAIN THE CONNECTION IF VALID CONDITION EXISTS").

However, if the request or response is indicates an error at a block 308 ("TEAR DOWN CONNECTION IF ERROR CONDITION EXISTS"), then the proxy service 208 tears down the connection 210. The proxy service 208 may then attempt to obtain correct/updated data, for use in attempting to re-establish the connection 210. Examples of error conditions are described further below with respect to FIG. 4.

Figure 4:
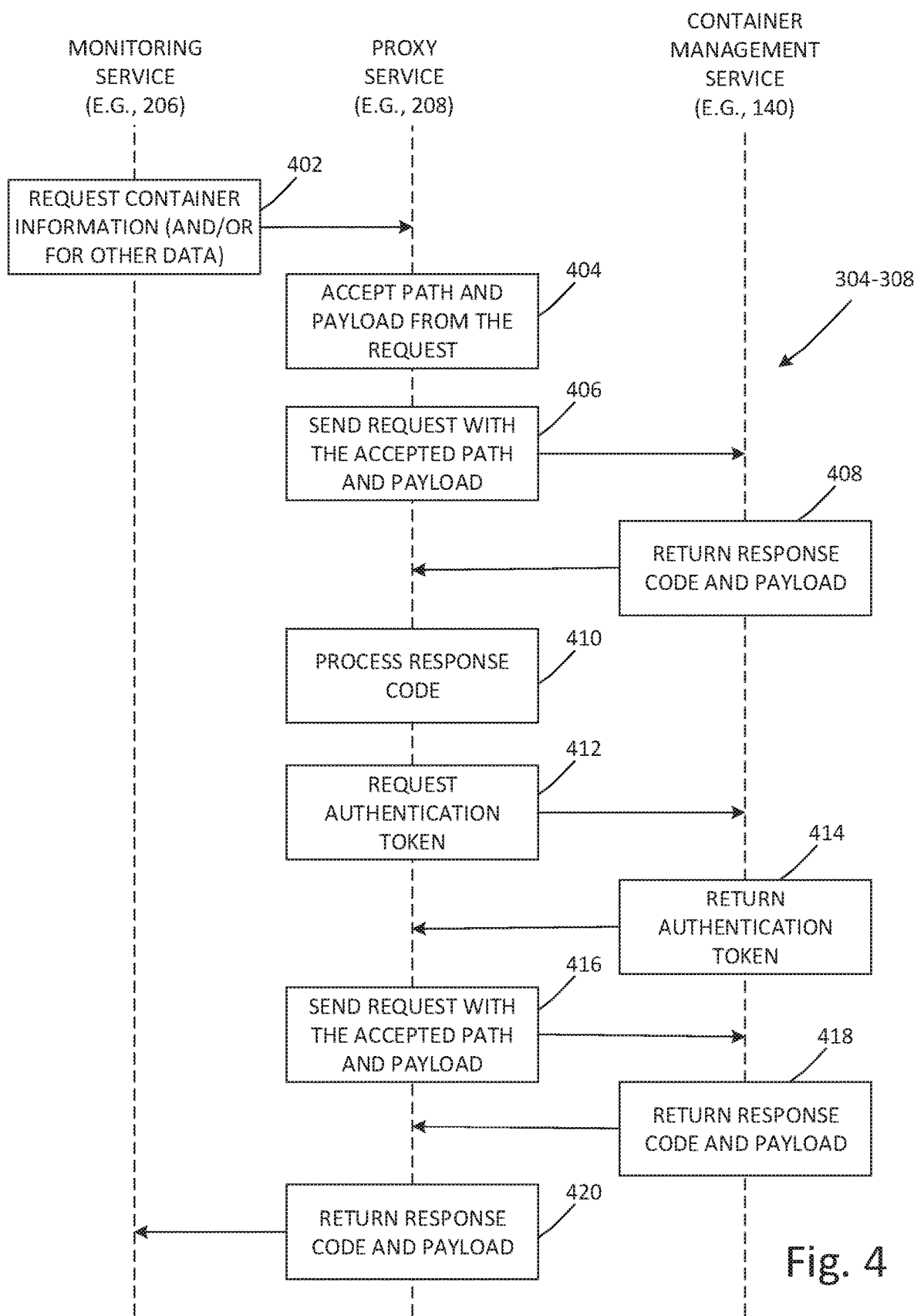
FIG. 4 is a flowchart showing further details of the example method of FIG. 3 for communication using a persistent connection between components.

FIG. 4 is a flowchart showing further details of the example method 300 of FIG. 3 for communication using a persistent connection between components. Specifically, FIG. 4 shows further details of the communication flow that occurs at the blocks 304-308 of FIG. 3.

The example communication flow of FIG. 4 may include one or more operations, functions, or actions illustrated by one or more blocks, such as blocks 402 to 420. The various blocks of the communication flow of FIG. 4 may be combined into fewer blocks, divided into additional blocks, supplemented with further blocks, and/or eliminated based upon the desired implementation. In one embodiment, the operations of the communication flow of FIG. 4 may be performed in a pipelined sequential manner. In other embodiments, some operations may be performed out-of-order, in parallel, etc. As depicted in FIG. 4, the various operations in the communication flow may be performed in a cooperative manner between the monitoring service 206, the proxy service 208, and the container management service 140.

At a block 402 ("REQUEST CONTAINER INFORMATION (AND/OR OTHER DATA)"), the monitoring service 206 generates and sends a request for container information and/or other data/resource. For example, the monitoring service 206 may generate a request for performance metrics of the containers 126-128, for presentation in the monitoring dashboard 202 on the user interface 200. The request may be in the form of one or more packets each having a request payload, or may be in any other suitable format or structure that conveys details of the request. Such details could include an ID of the container(s) for which information is being requested, the type of information/metrics being requested (e.g., CPU usage, memory usage, etc.), the timeframes for the information (e.g., CPU usage within the last hour, etc.), and so forth.

The monitoring service 206 sends the request to the proxy service 208, and the proxy service 208 accepts the path and the payload in the request, at a block 404 ("ACCEPT PATH AND PAYLOAD FROM THE REQUEST"). According to one embodiment where the request is in the form of a HTTP request having a uniform source locator (URL), the path corresponds to the path component of the URL, for the HTTP request, that identifies the resource (and/or it's location) that is being requested. The proxy service 208 then sends the request (having the accepted path and payload) to the container management service 140 via the connection 210, at a block 406 ("SEND REQUEST WITH THE ACCEPTED PATH AND PAYLOAD").

The container management system 140 receives the request from the proxy service 208, and obtains the requested container information from the applicable container(s) and/or their container engine. The container management system 140 generates a response, and sends the response to the proxy service 208, at a block 408 ("RETURN RESPONSE CODE AND PAYLOAD"). In one embodiment, the response returned to the proxy service 208 at the block 408 may include a response code and a response payload. The response code may indicate, for example, that the request was valid and so the response payload includes the information requested by the request. In other situations (described below), the response code may indicate an error.

At a block 410 ("PROCESS RESPONSE CODE"), the proxy service 208 receives the response from the container management service 140 via the connection 210 and processes the response code in the response. If the response code indicates a valid response (e.g., no error), then the proxy service 208 returns the response code and payload to the monitoring service 206, at a block 420 ("RETURN RESPONSE CODE AND PAYLOAD"), for presentation in the monitoring dashboard 202 and the connection 210 is maintained persistent.

Blocks 412-418 illustrate an example process that is performed, if the proxy service 208 determines at the block 410 that the response code indicates an error condition. In this example, the proxy service 208 determines that the response code indicates an authentication error (e.g., the request sent by the proxy service 208 at the block 406 is unauthenticated). The authentication error may be due, for example, an expiration of the current authentication token, an error in the current authentication token, or some other cause of invalidation of the current authentication token. The connection 210 between the proxy service 208 and the container management system 140 is therefore broken or torn down due to the authentication error. In response to the detection of the authentication error, the proxy service 208 generates a request for a new authentication token and sends the request to the container management service 140, at the block 412 ("REQUEST AUTHENTICATION TOKEN").

At a block 414 ("RETURN AUTHENTICATION TOKEN"), the container management service 140 returns a new authentication token to the proxy service 208 to replace the previous authentication token. The proxy service 208 then uses the new authentication token to re-establish a persistent connection with the management service 140 and to send (resend) the request having the accepted path and payload, at a block 416 ("SEND REQUEST WITH THE ACCEPTED PATH AND PAYLOAD"), to the container management service 140. The container management service 140 then returns a response (having a response code and payload) to the proxy service 208, at a block 418 ("RETURN RESPONSE CODE AND PAYLOAD"). When the proxy service 208 processes the response code and determines that there are no errors, then proxy service sends the response to the monitoring service at the block 420 (and the connection 210 is maintained persistent).

The foregoing description involved a situation wherein the proxy service 208 detected an authentication error. There are other types of errors that may be detected by the proxy service 208 in the response code, which would in turn result in the teardown of the persistent connection.

One example is a response code indicative of a bad/erroneous gateway. For instance, the address that the proxy service 208 attempts to use to reach the container management service 140 may be wrong or out-of-date, such as if the container management service 140 was updated or replaced and the proxy service 208 does not have a valid address for the updated container management service 140. With this type of response code, the proxy service 208 tears down or otherwise invalidates the current persistent connection, and tries to establish a new persistent connection using updated/correct gateway information (which may be provided to the proxy service 208 by the container management system 140 and/or by the management server 142).

Another example is a response code indicative of unavailable service. In this situation, the state of the HTTP client 201 is reset, including resetting, or refreshing, or regenerating one or more authentication tokens that are used to access the container management service 140. The proxy service 208 then attempts to establish/reestablish the HTTP connection to the container management service 140.

Still another example is a response code indicative of a bad request. For instance, the container ID specified in the request could be erroneous/outdated. This situation may be caused, for example, by an upgrade to the containers 126-128, the container engine 130, and/or the container management service 140, such that updated container IDs are not provided to the monitoring service 206. With this type of response code, the proxy service 208 may or may not tear down or otherwise invalidate the current persistent connection—the proxy service 208 may attempt to obtain the correct container ID from the container management system 140 and/or the management server 142, and then attempts the request again over the same or new persistent connection.

As still another example, the response code may be indicative of other types of errors (including unknown errors). In such a situation, the proxy service 208 tears down the persistent connection, and propagates the response code upstream (e.g., to the monitoring service 206) for presentation on the monitoring dashboard 202. From the monitoring dashboard 202, the system administrator can perform diagnostics to obtain more specific information about the error and to determine remediation steps.

Accordingly from the foregoing description, the connection between the proxy service 208 is maintained persistent through the use of a valid authentication token. The persistent connection (including sessions conducted on the persistent connection) are destroyed only when needed (such as if the error conditions described above are encountered), thereby effectively reducing the communication overhead.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2-4. For example, computing devices capable of acting as host devices or user devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to provide persistent connections between application components.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method in a virtualized computing environment to communicate using a connection, the method comprising:
   establishing, by a proxy, a persistent connection between the proxy and a container management service using an authentication token, wherein the container management service is configured to communicate information with containers, residing in the virtualized computing environment, that are managed by the container management service;
   establishing, by the proxy, a session on the persistent connection based on the authentication token, an address of the container management service and an identifier (ID) of a particular container of the containers;
   receiving, by the proxy from a monitoring service, a request for the information;
   sending, by the proxy to the container management service, the request for the information;
   receiving, by the proxy from the container management service, a response to the request;
   maintaining the persistent connection and the session, if the response is indicative of a valid request and contains the requested information, and sending, by the proxy, the response to the monitoring service; and
   tearing down, by the proxy, the persistent connection, if the response is indicative of an error.

2. The method of claim 1, wherein the persistent connection is a hypertext transfer protocol (HTTP) connection.

3. The method of claim 1, wherein the proxy and the monitoring service are components of an HTTP client that presents the requested information in a monitoring dashboard.

4. The method of claim 1, wherein establishing the session includes:
   determining the address of the container management service;
   acquiring the authentication token;
   determining the ID; and
   launching the proxy.

5. The method of claim 1, wherein the error includes at least one of: an authentication error, a gateway error, an unavailable service, a request error, or an error to propagate to the monitoring service for review by a system administrator.

6. The method of claim 5, further comprising, in response to the authentication error:
   requesting, by the proxy from the container management service, a new authentication token;
   receiving, by the proxy from the container management service, the new authentication token;
   using, by the proxy, the new authentication token to re-establish the persistent connection; and
   sending, by the proxy to the container management service, the request for the information using the re-established persistent connection.

7. The method of claim 1, wherein the proxy is a service that processes the request to determine path information and payload information that specifies details of the request.

8. A non-transitory computer-readable medium having instructions stored thereon, which in response to execution by one or more processors, cause the one or more processors to perform or control performance of operations for a proxy in a virtualized computing environment to communicate using a connection, the operations comprising:
   establishing, by a proxy, a persistent connection between the proxy and a container management service using an authentication token, wherein the container management service is configured to communicate information with containers, residing in the virtualized computing environment, that are managed by the container management service;
   establishing, by the proxy, a session on the persistent connection based on the authentication token, an address of the container management service and an identifier (ID) of a particular container of the containers;
   receiving, by the proxy from a monitoring service, a request for the information;
   sending, by the proxy to the container management service, the request for the information;
   receiving, by the proxy from the container management service, a response to the request;
   maintaining the persistent connection and the session, if the response is indicative of a valid request and contains the requested information, and sending, by the proxy, the response to the monitoring service; and
   tearing down, by the proxy, the persistent connection, if the response is indicative of an error.

9. The non-transitory computer-readable medium of claim 8, wherein the persistent connection is a hypertext transfer protocol (HTTP) connection.

10. The non-transitory computer-readable medium of claim 8, wherein the proxy and the monitoring service are components of an HTTP client that presents the requested information in a monitoring dashboard.

11. The non-transitory computer-readable medium of claim 8, wherein establishing the session includes:
    determining the address of the container management service;
    acquiring the authentication token;
    determining the identifier (ID) of a particular container to be monitored; and
    launching the proxy.

12. The non-transitory computer-readable medium of claim 8, wherein the error includes at least one of: an authentication error, a gateway error, an unavailable service, a request error, or an error to propagate to the monitoring service for review by a system administrator.

13. The non-transitory computer-readable medium of claim 12, wherein the operations further comprise, in response to the authentication error:
    requesting, by the proxy from the container management service, a new authentication token;
    receiving, by the proxy from the container management service, the new authentication token;
    using, by the proxy, the new authentication token to re-establish the persistent connection; and
    sending, by the proxy to the container management service, the request for the information using the re-established persistent connection.

14. The non-transitory computer-readable medium of claim 13, wherein the proxy is a service that processes the request to determine path information and payload information that specifies details of the request.

15. A device, comprising:
    a processor to operate a proxy; and
    a non-transitory computer-readable medium coupled to the processor and having instructions stored thereon, which in response to execution by the processor, cause the processor to perform or control performance of operations for the proxy to communicate using a connection in a virtualized computing environment, wherein the operations include:
       establishing, by a proxy, a persistent connection between the proxy and a container management service using an authentication token, wherein the container management service is configured to communicate information with containers, residing in the virtualized computing environment, that are managed by the container management service;
       establishing, by the proxy, a session on the persistent connection based on the authentication token, an address of the container management service and an identifier (ID) of a particular container of the containers;
       receiving, by the proxy from a monitoring service, a request for the information;
       sending, by the proxy to the container management service, the request for the information;
       receiving, by the proxy from the container management service, a response to the request;
       maintaining the persistent connection and the session, if the response is indicative of a valid request and contains the requested information, and send, by the proxy, the response to the monitoring service; and
       tearing down, by the proxy, the persistent connection, if the response is indicative of an error.

16. The device of claim 15, wherein the persistent connection is a hypertext transfer protocol (HTTP) connection.

17. The device of claim 15, wherein the proxy and the monitoring service are components of an HTTP client that presents the requested information in a monitoring dashboard of the device.

18. The device of claim 15, wherein establishing the session includes operations that include:
    determining the address of the container management service;
    acquiring the authentication token;
    determining the identifier (ID) of a particular container to be monitored; and
    launching the proxy.

19. The device of claim 15, wherein the error includes at least one of: an authentication error, a gateway error, an unavailable service, a request error, or an error to propagate to the monitoring service for review by a system administrator.

20. The device of claim 19, wherein the operations further comprise, in response to the authentication error:
- requesting, by the proxy from the container management service, a new authentication token;
- receiving, by the proxy from the container management service, the new authentication token;
- using, by the proxy, the new authentication token to re-establish the persistent connection; and
- sending, by the proxy to the container management service, the request for the information using the re-established persistent connection.

21. The device of claim 15, wherein the proxy is a service that processes the request to determine path information and payload information that specifies details of the request.

* * * * *